US006939105B2

(12) United States Patent
Horng et al.

(10) Patent No.: US 6,939,105 B2
(45) Date of Patent: Sep. 6, 2005

(54) AIRFLOW GUIDING STRUCTURE FOR A HEAT-DISSIPATING FAN

(75) Inventors: Alex Horng, Kaohsiung (TW); Yin-Rong Hong, Kaohsiung (TW); Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 25 days.

(21) Appl. No.: 10/656,368

(22) Filed: Sep. 8, 2003

(65) Prior Publication Data

US 2005/0025621 A1 Feb. 3, 2005

(30) Foreign Application Priority Data

Aug. 1, 2003 (TW) ....................................... 92121204 A

(51) Int. Cl.[7] ................................................. F03D 1/04

(52) U.S. Cl. .................... 415/191; 415/206; 415/211.2; 415/220

(58) Field of Search ............................. 415/211.2, 206, 415/191, 220, 221

(56) References Cited

U.S. PATENT DOCUMENTS

| | | | | | |
|---|---|---|---|---|---|
| 2,713,967 | A | * | 7/1955 | Schneider et al. | 415/211.2 |
| 3,144,201 | A | * | 8/1964 | William | 415/220 |
| 4,548,548 | A | * | 10/1985 | Gray, III | 416/189 |
| 4,603,271 | A | * | 7/1986 | Maruyama et al. | 416/169 A |
| 5,096,373 | A | * | 3/1992 | Struve et al. | 415/223 |
| 5,342,167 | A | * | 8/1994 | Rosseau | 415/208.2 |
| 6,017,191 | A | * | 1/2000 | Harmsen | 415/208.2 |
| 6,501,652 | B2 | * | 12/2002 | Katsui | 361/697 |
| 6,663,342 | B2 | * | 12/2003 | Huang et al. | 415/208.2 |

* cited by examiner

*Primary Examiner*—Edward K. Look
*Assistant Examiner*—Igor Kershteyn
(74) *Attorney, Agent, or Firm*—Bacon & Thomas, PLLC

(57) ABSTRACT

A heat-dissipating fan includes a casing having an air outlet, a base mounted in the air outlet, and a plurality of guiding plates in the air outlet. An impeller is mounted on the base that is supported in the air outlet by the guiding plates. The guiding plates are parallel to one another and extend in a direction having an inclining angle with respect to an axial direction of the air outlet. The guiding plates guide airflow and increase wind pressure when the impeller turns.

9 Claims, 8 Drawing Sheets

AIRFLOW GUIDING STRUCTURE FOR A HEAT-DISSIPATING FAN

BACKGROUND OF THE INVENTION

1. Field of the Invention

The present invention relates to an airflow guiding structure for a heat-dissipating fan.

2. Description of Related Art

FIG. 1 of the drawings illustrates a typical heat-dissipating fan including a casing 10, an air inlet 11 defined in a side of the casing 10, an air outlet 12 defined in the other side of the casing 10, a base 13, and a plurality of ribs 14*a*. The base 13 is secured by the ribs 14*a* in the air outlet 12. A stator (not shown) and an impeller (not shown) are mounted to the base 13. When the impeller turns, air is sucked into the casing 10 via the air inlet 11 and exits the casing 10 via the air outlet 12 to dissipate heat from an object such as a fin or a central processing unit.

Although the above-mentioned heat-dissipating fan provides a certain heat-dissipating effect, the heat-dissipating operation can only be performed on an object directly below the air outlet 12, as the airflow can only flow along an axial direction of the air outlet 12. In a case that the object is not located directly below the air outlet 12, the airflow cannot flow through the object in a uniform manner, resulting in non-uniform heat dissipation and poor heat-dissipating effect. On the other hand, since the object is generally mounted in a limited space such as in a notebook type computer (or a laptop computer) in a position not directly below the base 13 or outside the area of air outlet, the heat-dissipating effect is adversely affected. The heat-dissipating effect is also adversely affected if the object is too large to be completely within an area directly below the heat-dissipating fan. Further, turbulence tends to occur when the airflow is passing through the ribs 14*a*. Noise is thus generated while having a lower heat-dissipating effect.

OBJECTS OF THE INVENTION

An object of the present invention is to provide a heat-dissipating fan with an airflow guiding structure including a casing having an air outlet and a plurality of guiding plates in the air outlet of the casing. The guiding plates are parallel to one another and extend in a direction having an inclining angle with respect to an axial direction of the air outlet, thereby guiding airflow and improving the overall heat-dissipating efficiency.

Another object of the present invention is to provide a heat-dissipating fan with an airflow guiding structure including a casing having an air outlet and a plurality of guiding plates in the air outlet of the casing. The guiding plates may be orientated according to the position of an object to be dissipated, thereby concentrating the airflow for providing improved heat-dissipating effect. The overall heat-dissipating efficiency is improved, and the assembly and design of the heat-dissipating fan are more flexible.

A further object of the present invention is to provide a heat-dissipating fan with an airflow guiding structure including a casing having an air outlet and a plurality of guiding plates in the air outlet of the casing. The guiding plates are parallel to one another and have a triangular section for increasing wind pressure and improving the overall heat-dissipating efficiency.

Still another object of the present invention is to provide a heat-dissipating fan with an airflow guiding structure including a casing having an air outlet and a plurality of guiding plates in the air outlet of the casing. The guiding plates are parallel to one another. Further, each guiding plate has a first end adjacent to the air inlet side and a second end adjacent to the air outlet side, with each of the first end and the second end having an arcuate guiding portion. The noise generated as a result of tangential wind is reduced, and the overall heat-dissipating efficiency is improved.

Yet another object of the present invention is to provide a heat-dissipating fan with an airflow guiding structure including a casing having an air outlet and a plurality of guiding plates in the air outlet of the casing. The guiding plates are parallel to one another and may be rectilinear, V-shaped, or arcuate to form a grid-like structure, thereby providing an aesthetically pleasing effect and added value for the heat-dissipating fan.

SUMMARY OF THE INVENTION

In accordance with an aspect of the invention, a heat-dissipating fan includes a casing having an air outlet, a base mounted in the air outlet, and a plurality of guiding plates in the air outlet. An impeller is mounted on the base that is supported in the air outlet by some of the guiding plates. The guiding plates are parallel to one another and extend in a direction having an inclining angle with respect to an axial direction of the air outlet. The guiding plates guide airflow and increase wind pressure when the impeller turns.

The guiding plates form a grid-like structure and may be rectilinear, V-shaped, or arcuate. Some of the guiding plates are connected between the base and the casing for supporting the base in the air outlet. The inclining angles of the guiding plates may be identical to or different from one another. Preferably, the guiding plates have a triangular section. The casing may include a side outlet in a peripheral wall thereof. The side outlet is communicated with the air outlet for more smoothly guiding the airflow out of the casing.

Each guiding plate has a first end adjacent to the air inlet side and a second end adjacent to the air outlet side. The first end of the respective guiding plate may have an arcuate guiding portion. Also, the second end of the respective guiding plate may have an arcuate guiding portion.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
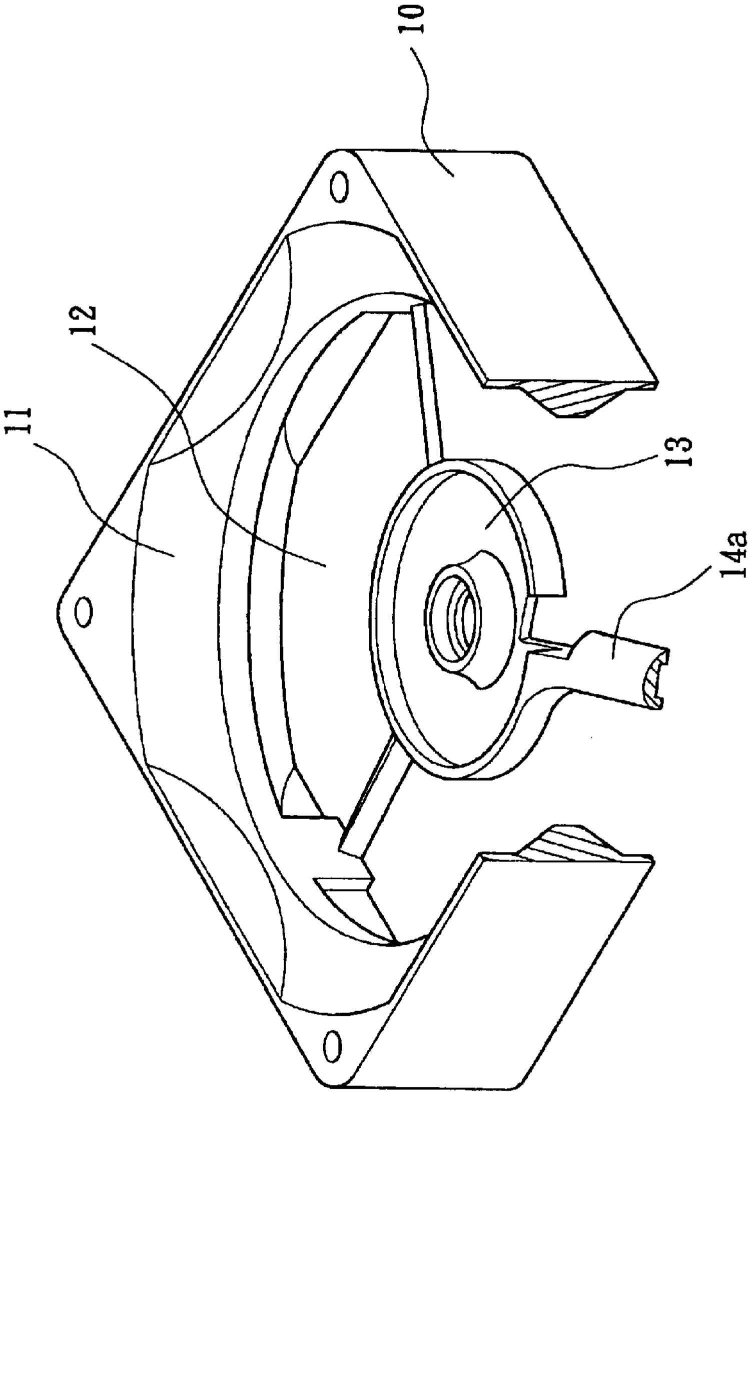
FIG. 1 PRIOR ART
FIG. 1 is a perspective view, partly cutaway, of a conventional heat-dissipating fan.

Preferred embodiments of the present invention are now to be described hereinafter in detail, in which the same reference numerals are used in the preferred embodiments for the same parts as those in the prior art to avoid redundant description.

Figure 2:
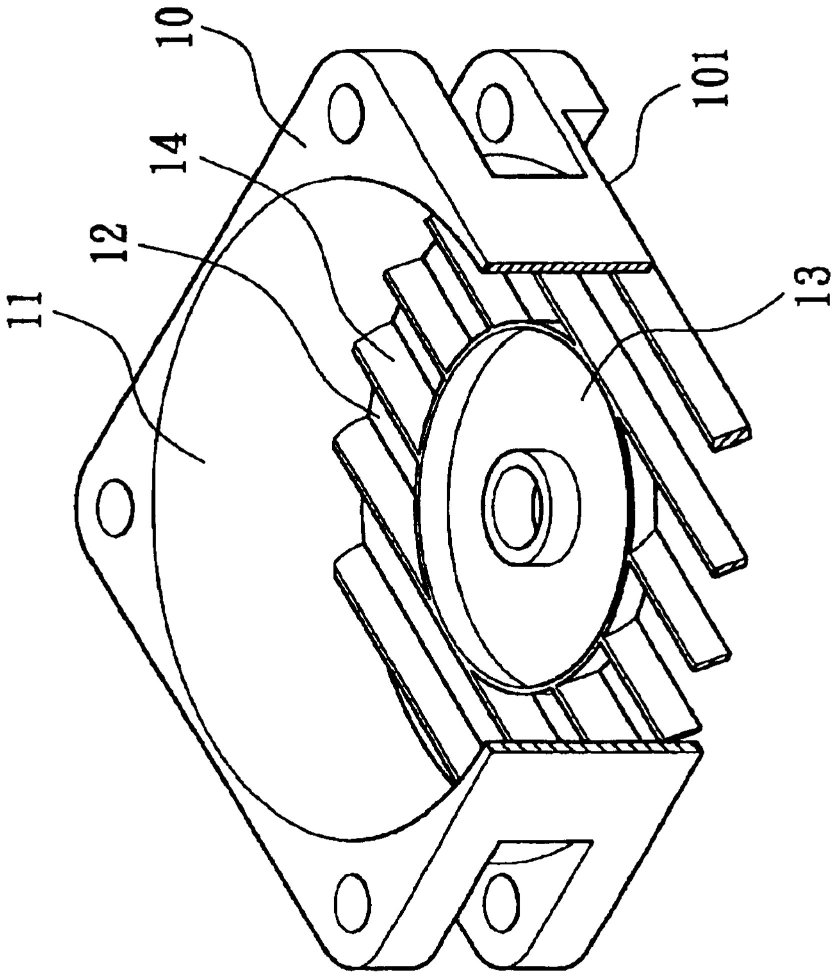
FIG. 2 is a perspective view, partly cutaway, of a heat-dissipating fan with a first embodiment of an air guiding structure in accordance with the present invention.
Figure 3:
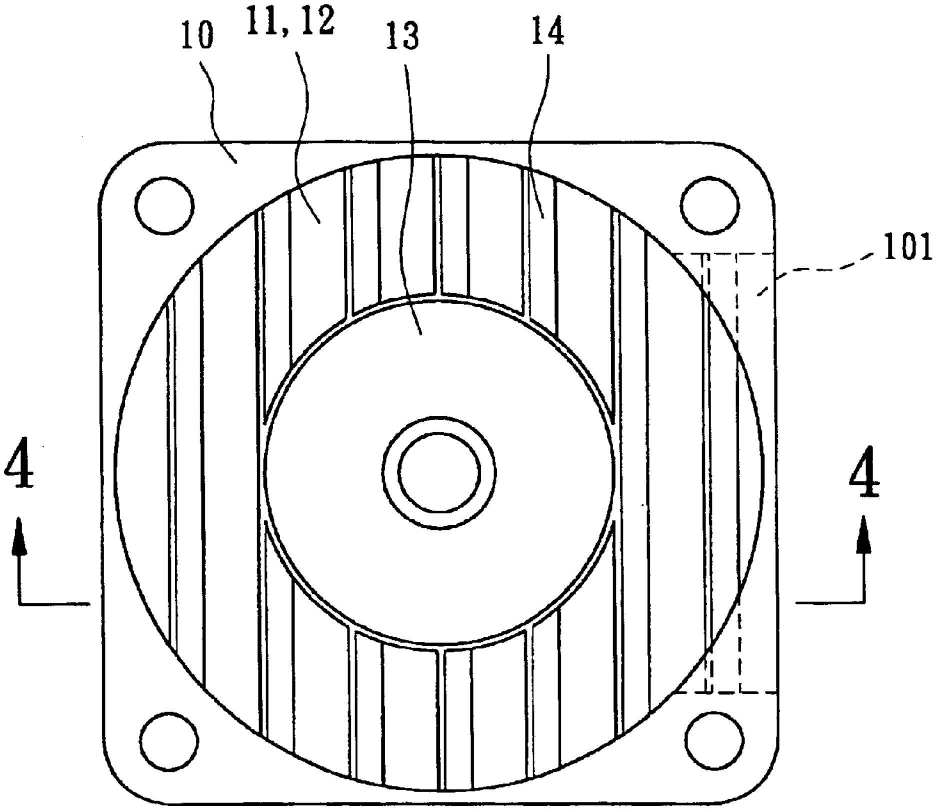
FIG. 3 is a top view of the heat-dissipating fan in FIG. 2.
Figure 4:
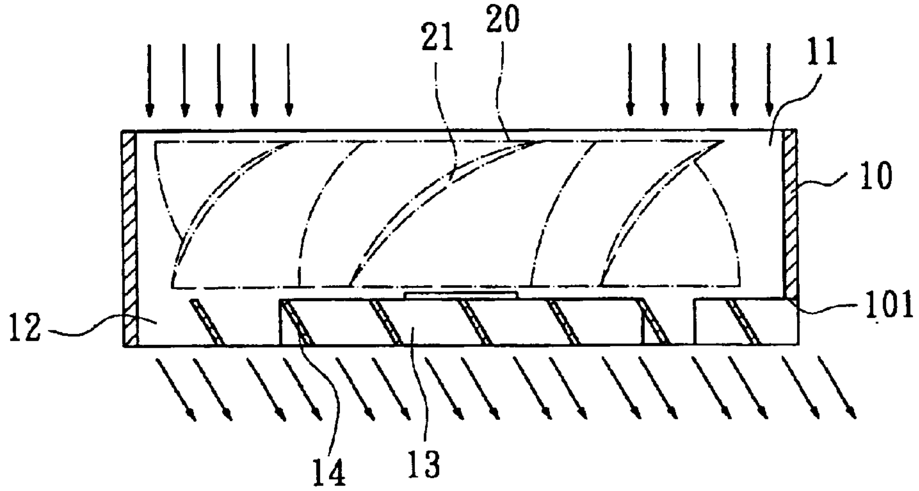
FIG. 4 is a sectional view taken along line 4—4 in FIG. 3.

Referring to FIGS. 2 through 4, a heat-dissipating fan with a first embodiment of an air guiding structure in accordance with the present invention includes a casing 10, an air inlet 11, an air outlet 12, a base 13, a plurality of guiding plates 14, and a side outlet 101. The casing 10 may be made of plastics or metal, with the air inlet 11 and the air outlet 12 being respectively defined in two opposite sides of the casing 10. The base 13 is located on the air outlet side, and an impeller 20 (FIG. 4) is mounted on the base 13. The guiding plates 14 are parallel to one another and extend in the air outlet 12 along a predetermined direction. Some of the guiding plates 14 are connected between the casing 10 and the base 13 for supporting the base 13 in the air outlet 12. Preferably, the guiding plates 14 form a grid-like structure and are rectilinear. Further, each guiding plate 14 extends in a direction having an inclining angle with respect to an axial direction of the air outlet 12. The inclining angles of the guiding plates 14 may be identical to or different from one another. The side outlet 101 is defined in a peripheral wall of the casing 10 and communicates with the air outlet 12, allowing the airflow exiting the air outlet 12 to flow more smoothly along the inclining angles of the guiding plates 14.

Still referring to FIG. 4, when the impeller turns 20, blades 21 of the impeller 20 introduce airflow into the casing 10 via the air inlet 11 and expel the airflow via the air outlet 12, thereby dissipating heat from an object such as a fin or central processing unit (not shown). When the airflow passes through the guiding plates 14, since each guiding plate 14 extends in a direction having an inclining angle with respect to the axial direction of the air outlet 12, the airflow can be smoothly guided out of the casing 10 toward a predetermined direction via the air outlet 12 and the side outlet 101. Thus, the heat-dissipating efficiency of the heat-dissipating fan is improved through the use of the guiding plates 14. In particular, when the heat-dissipating fan is mounted in a limited space (e.g., in a notebook type computer or laptop computer) that is not suitable for operation of a blower type heat-dissipating fan, the guiding plates 14 of the heat-dissipating fan may reliably guide the airflow to an object in a position not directly below the air outlet 12 or to an object having a relatively large size for dissipating heat along a predetermined direction.

Further, still referring to FIG. 4, since a side outlet 101 is defined in the peripheral wall of the casing 10 and communicated with the air outlet 12, the possibility of impeding an inner wall face of the peripheral wall of the casing 10 by the airflow exiting the casing 10 along an inclined direction is largely reduced. Thus, the possibility of generation of turbulence is reduced, and the noise generated as a result of tangential wind is lowered. Further, the rectilinear guiding plates 14 provide an aesthetically pleasing appearance and added value for the heat-dissipating fan.

Figure 5:
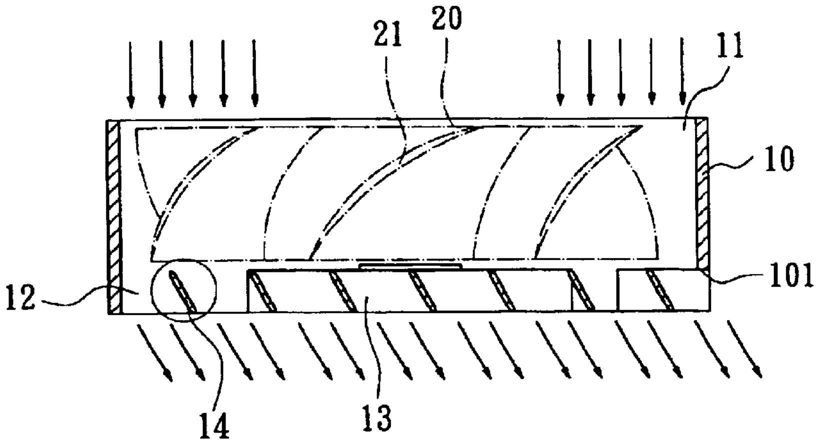
FIG. 5 is a sectional view similar to FIG. 4, illustrating a heat-dissipating fan with a second embodiment of the air guiding structure in accordance with the present invention.
Figure 5A:
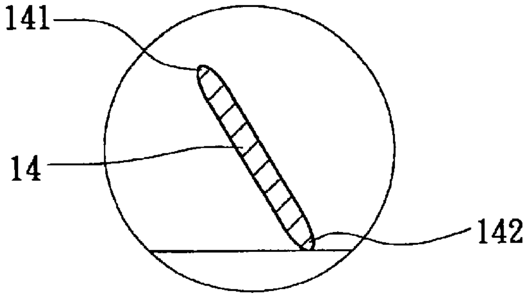
FIG. 5A is an enlarged view of a circled portion in FIG. 5.

FIGS. 5 and 5A illustrate a heat-dissipating fan with a second embodiment of the air guiding structure in accordance with the present invention. In this embodiment, each guiding plate has a first end adjacent to the air inlet side and a second end adjacent to the air outlet side, with each of the first end and the second end having an arcuate guiding portion 141, 142. The possibility of generation of noise as a result of tangential wind is further reduced, as the airflow may flow more smoothly through the guiding plates 14.

Figure 6:
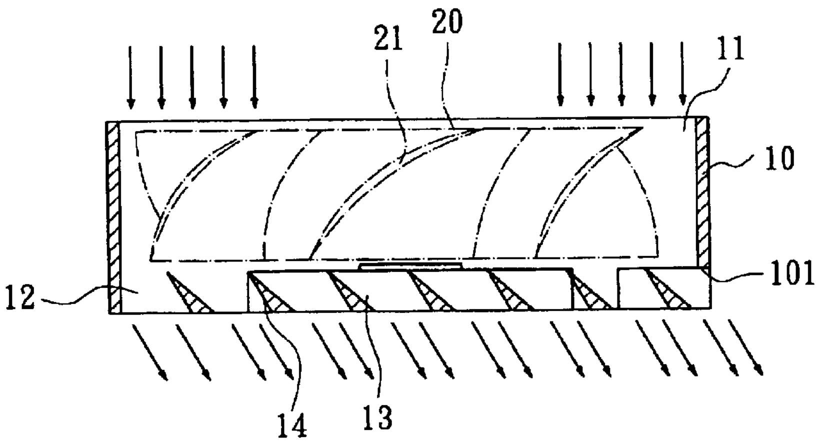
FIG. 6 is a sectional view similar to FIG. 4, illustrating a heat-dissipating fan with a third embodiment of the air guiding structure in accordance with the present invention.

FIG. 6 illustrates a heat-dissipating fan with a third embodiment of the air guiding structure in accordance with the present invention. In this embodiment, each guiding plate 14 has a triangular section while extending in a direction having an inclining angle with respect to the axial direction of the air outlet 12. The guiding plates 14 may concentrate and guide airflow to a predetermine direction. Further, the wind pressure is increased, as the sectional area on the air outlet side is decreased by the guiding plates 14 having a triangular section.

Figure 7:
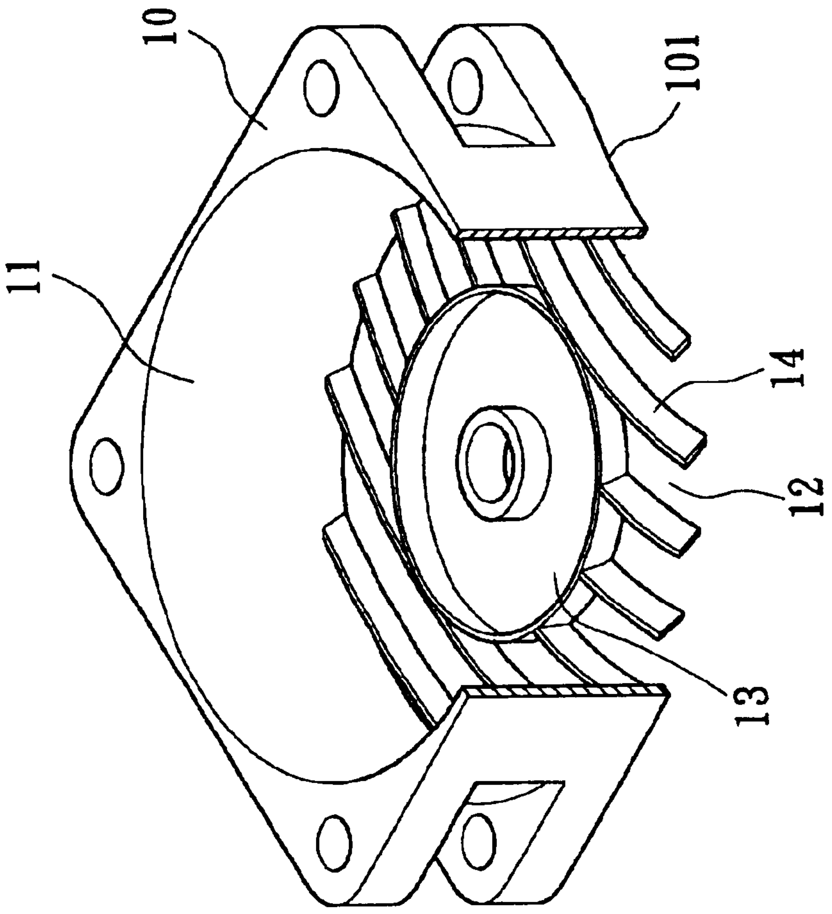
FIG. 7 is a perspective view, partly cutaway, of a heat-dissipating fan with a fourth embodiment of the air guiding structure in accordance with the present invention.
Figure 8:
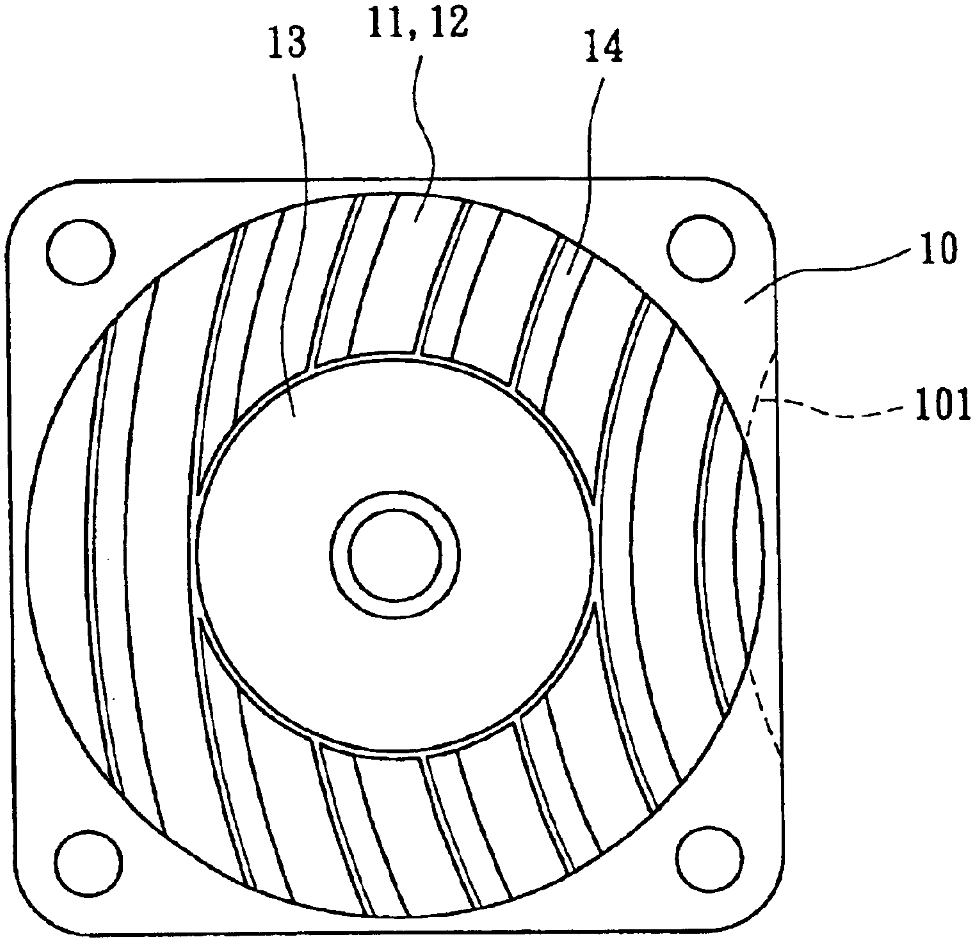
FIG. 8 is a top view of the heat-dissipating fan in FIG. 7.

FIGS. 7 and 8 illustrate a heat-dissipating fan with a fourth embodiment of the air guiding structure in accordance with the present invention. In this embodiment, each guiding plate 14 is arcuate, and the side outlet 101 is also arcuate. By this arrangement, the guiding plate 14 may concentrate and guide the airflow in a smoother manner and reduce the noise generated as a result of tangential wind. Further, the arcuate guiding plates 14 provide an aesthetically pleasing appearance and added value for the heat-dissipating fan.

Figure 9:
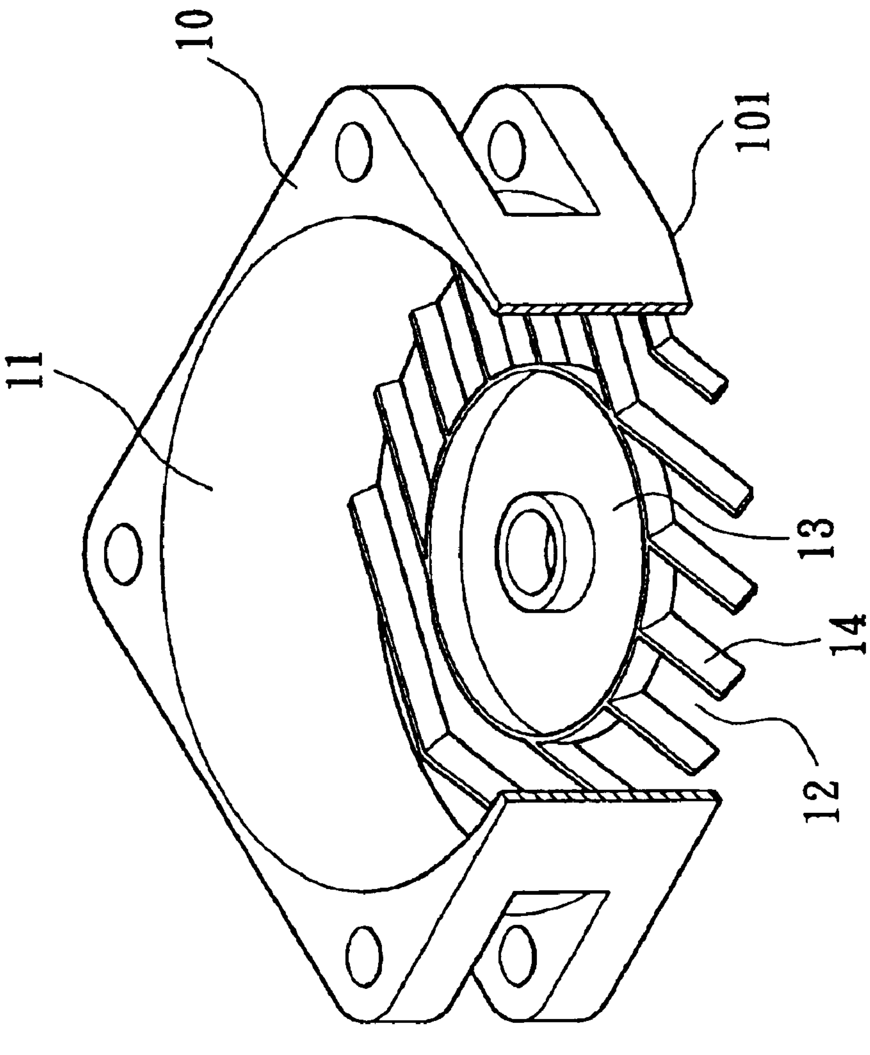
FIG. 9 is a perspective view, partly cutaway, of a heat-dissipating fan with a fifth embodiment of the air guiding structure in accordance with the present invention.
Figure 10:
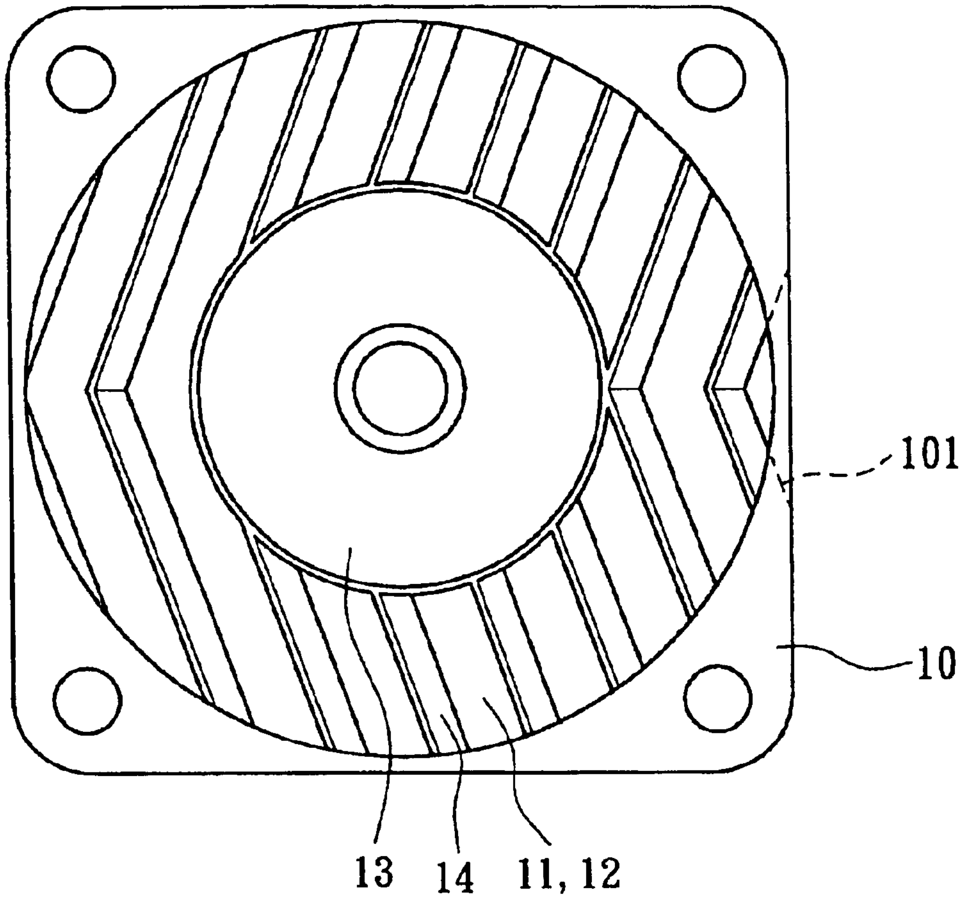
FIG. 10 is a top view of the heat-dissipating fan in FIG. 9.

FIGS. 9 and 10 illustrate a heat-dissipating fan with a fifth embodiment of the air guiding structure in accordance with the present invention. In this embodiment, each guiding plate 14 is V-shaped, and the side outlet 101 is also arcuate. By this arrangement, the guiding plate 14 may concentrate and guide the airflow in a smoother manner and reduce the noise generated as a result of tangential wind. Further, the arcuate guiding plates 14 provide an aesthetically pleasing appearance and added value for the heat-dissipating fan.

As illustrated in FIGS. 2 through 10, by means of providing a plurality of guiding plates 14, the airflow direction can be guided. Further, the number, inclining directions, and the inclining angles of the guiding plates 14 can be altered in response to the size, location, and shape of the blades 21 of the impeller 20 and of the object to be dissipated as well as the amount of heat to be dissipated. The assembly and design of the heat-dissipating fan are thus more flexible.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A heat-dissipating fan comprising:

a casing having a peripheral wall defining an air outlet and a side outlet, said side outlet connected to and in communication with said air outlet;

a base mounted in the air outlet, an impeller being adapted to be mounted on the base and having a plurality of blades; and a plurality of guiding plates mounted in the air outlet of the casing, at least one of said guiding plates being arranged adjacent to said air outlet and having an inclination toward said side outlet, another of the guiding plates being aligned along a predetermined direction and extending in a direction having an inclining angle with respect to an axial direction of the air outlet, the guiding plates guiding airflow passing though the air outlet and increasing wind pressure of the air flow when the impeller turns.

2. The heat-dissipating fan as claimed in claim 1, wherein the guiding plates are parallel to one another.

3. The heat-dissipating fan as claimed in claim 1, wherein the guiding plates are one of rectilinear, arcuate, and V-shaped.

4. The heat-dissipating fan as claimed in claim 1, wherein each said guiding plate has an end adjacent to the air inlet side, the end of each said guiding plate having an arcuate guiding portion.

5. The heat-dissipating fan as claimed in claim 1, wherein each said guiding plate has an end adjacent to the air outlet side, the end of each said guiding plate having an arcuate guiding portion.

6. The heat-dissipating fan as claimed in claim 1, wherein each said guiding plate has a triangular section.

7. The heat-dissipating fan as claimed in claim 1, wherein the inclining angles of the guiding plates are identical to one another.

8. The heat-dissipating fan as claimed in claim 1, wherein inclining angles of the guiding plates are different from one another.

9. The heat-dissipating fan as claimed in claim 1, wherein the base is supported by some of the guiding plates connected between the base and the casing.

* * * * *